(12) United States Patent
Kotthoff et al.

(10) Patent No.: US 7,433,933 B2
(45) Date of Patent: Oct. 7, 2008

(54) APPARATUS AND PROCESS FOR A COMPUTER INPUT DEVICE

(76) Inventors: Gery G. Kotthoff, 948 Barrett Station Rd., Kirkwood, MO (US) 63122; Jonathan D. Kotthoff, 4463 Maryland Ave., St. Louis, MO (US) 63108

( * ) Notice: Subject to any disclaimer, the term of this patent is extended or adjusted under 35 U.S.C. 154(b) by 0 days.

(21) Appl. No.: 11/110,123

(22) Filed: Apr. 20, 2005

(65) Prior Publication Data
US 2006/0031403 A1 Feb. 9, 2006

Related U.S. Application Data

(60) Provisional application No. 60/564,663, filed on Apr. 23, 2004.

(51) Int. Cl.
 *G06F 15/16* (2006.01)
 *G06Q 30/00* (2006.01)
 *B65D 81/36* (2006.01)
(52) U.S. Cl. .............................. 709/217; 705/14; 446/76
(58) Field of Classification Search ................ 709/217, 709/218, 219, 226, 245; 705/14; 345/156, 345/163; 707/1; 446/71–81; D14/432
See application file for complete search history.

(56) References Cited

U.S. PATENT DOCUMENTS

| | | | |
|---|---|---|---|
| 3,835,464 A | 9/1974 | Rider | |
| 5,912,661 A | 6/1999 | Siddiqui | |
| 6,014,130 A | 1/2000 | Yung-Chou | |
| 6,097,371 A | 8/2000 | Siddiqui | |
| 6,157,369 A | 12/2000 | Merminod | |
| D453,335 S * | 2/2002 | Downs | D14/432 |
| 6,353,429 B1 | 3/2002 | Long | |
| D466,509 S | 12/2002 | Li | |
| D467,585 S | 12/2002 | Li | |
| 6,525,713 B1 | 2/2003 | Soeta | |
| D476,006 S | 6/2003 | Li | |
| 6,608,616 B2 | 8/2003 | Lin | |
| 6,724,365 B1 | 4/2004 | Escamilla | |
| 6,842,169 B2 | 1/2005 | Griffin | |
| 2001/0024189 A1* | 9/2001 | Michie | 345/156 |
| 2003/0208404 A1* | 11/2003 | Michie | 705/14 |
| 2004/0004931 A1* | 1/2004 | Pergl | 369/283 |
| 2004/0151873 A1* | 8/2004 | Mabbutt | 428/120 |
| 2005/0036640 A1* | 2/2005 | Goldenberg | 381/334 |
| 2005/0253811 A1* | 11/2005 | Hiromori | 345/163 |

\* cited by examiner

*Primary Examiner*—Paul H Kang
(74) *Attorney, Agent, or Firm*—Douglas E. Warren

(57) ABSTRACT

A computer input device is described as being in the general form of a computer mouse with standard computer mouse functions in addition to having the capability of allowing the user of the computer input device to access a vendor's Internet web page, domain name, or URL address by actuating a switch on the computer mouse. The a vendor's Internet web page, domain name, or URL address may be preprogrammed into a computer ship in the computer mouse. In other embodiments of the computer input device, the form and shape of the computer input device relate in some way the vendor's products of services. The Internet web page, domain name, or URL address may be controlled and maintained by the vendor or by an intermediate advertising service such that different information about the vendor's products or services may be provide to the user of the computer input device.

22 Claims, 2 Drawing Sheets

APPARATUS AND PROCESS FOR A COMPUTER INPUT DEVICE

CROSS-REFERENCE TO RELATED APPLICATIONS

This patent application is related to U.S. Provisional Patent Application, Ser. No. 60/564,663 filed on Apr. 23, 2004 from which priority is claimed.

STATEMENT REGARDING FEDERALLY SPONSORED RESEARCH

Not Applicable.

BACKGROUND OF THE INVENTION

1. Field of the Invention

The present invention relates to a computer input device and process that includes a computer mouse with an actuatable button that, when activated, instructs the computer system to which the computer mouse is connected to access an Internet web page, domain name, or URL address stored within the computer mouse. In other embodiments of the present invention, the computer input device incorporates a unique promotional housing design with the ability to have the computer mouse preprogrammed to allow the user of the computer mouse to quickly access an Internet web page that corresponds to the promotional design of the computer mouse housing.

2. Related Art

Computer systems require three primary components. First there must be a computer processing unit (CPU) that contains the computing hardware, operating software, and storage devices. Second, there must be a device by which the computer can communicate with the user. This generally takes the form of monitoring display device such as a cathode ray tube (CRT) or some other form of graphic display component. Additionally, other output devices such a printers are used. Finally, there must be at least one input device that allows the computer user to input commands and information to the CPU. For example, keyboards are an ideal method of inputting alphanumeric characters to the computer for most applications. Other input devices such as joysticks are used with computer games to provide two-dimensional position signals based on wrist movement.

The computer mouse, however, is the most predominant input device and is used with virtually every computer in operation today. In fact, the use of a "mouse" as a manually moveable and operated graphic user interface (GUI) to control computers has become so widespread as to be nearly universal.

A computer mouse is essentially a pointing device that can include elements such as trackballs or a housing partially enclosing a rotatable ball. The common computer mouse also has one or more actuatable buttons. Electronic encoders sense the rotation of the trackball or rotatable ball to generate signals that control the two-dimensional movement of a cursor or pointer on the display screen of the computer. While earlier designs of the computer mouse utilized rotatable balls that drive encoders to generate positional signals to the computer system, recent designs utilize optical components that generate positional signals for the computer system by sensing the movement of the computer mouse across a surface.

In addition to the one or more actuatable buttons, most current computer mice also use a rotatable wheel located near the actuatable buttons. These rotatable wheels provide the computer mouse with the capability of providing a three-dimensional position signal that permits the illusory positioning of the cursor in three-dimensional space on a two-dimensional video display device. These wheels not only rotate about an axle, but are also commonly capable of being momentarily depressed to provide various input signals to a computer to control not only three-dimensional positions of an object, but other options or attributes for that object. Because the most common application of the rotatable wheel is to allow for the up or down scrolling of a document or image shown on the computer monitor, the rotatable wheel is commonly known as the "scroll wheel."

Therefore, the standard computer mouse provides a tool that is capable of sending a wide variety of signals to the computer processing unit of a computer system.

SUMMARY OF THE INVENTION

The present invention is generally directed to a computer mouse that allows a user of the computer mouse to access a unique Internet web page, domain name, or URL address by activation of one actuatable button on the computer mouse. In other embodiments, the overall appearance of the computer mouse represents a promotional design to advertise or suggest a particular association between the shape or form of the computer housing and the products or services sold by a commercial vendor. To compliment the promotional design of the computer mouse housing, the scroll wheel or other actuatable switch on the computer mouse sends a signal to the computer chip within the computer mouse that in turn sends a unique signal to the computer processing unit of a computer system that causes the computer system to log onto the Internet and access a vendor's specific Internet web page. The promotional design of the computer mouse housing and the ability to use the mouse to access a vendor's web page with the activation of only one of the actuatable switches on the computer mouse results in a computer mouse usable as a promotional item vendors can use to advertise the vendor's goods and services.

DESCRIPTION OF THE DRAWINGS

In the accompanying drawings which form part of the specification.

Corresponding reference numerals indicate corresponding parts throughout the several figures of the drawings.

Figure 1:
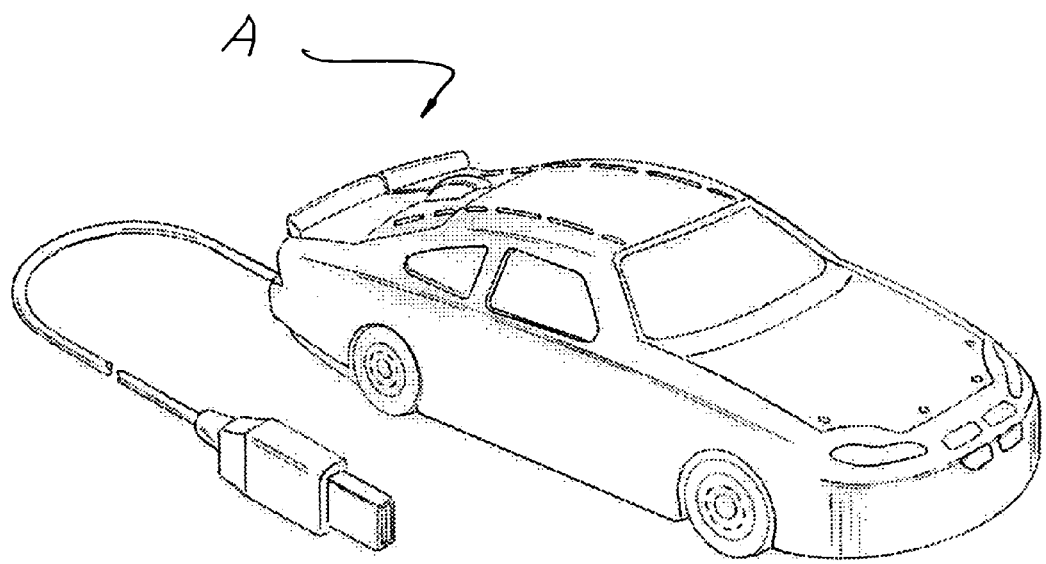
FIG. 1 is a front perspective view of one embodiment of the present invention.
Figure 2:
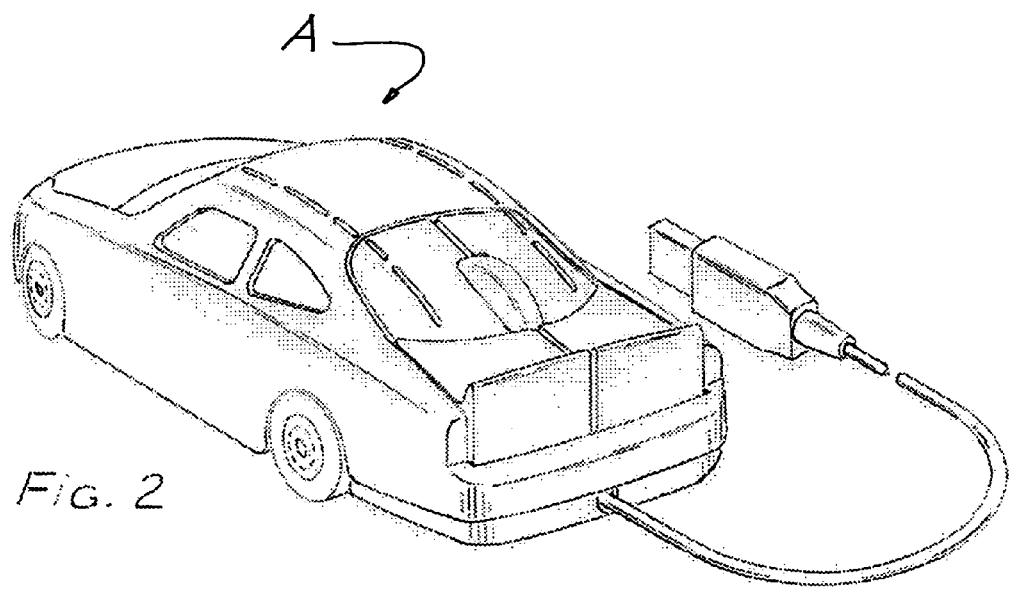
FIG. 2 is a rear perspective view of one embodiment of the present invention.
Figure 3:
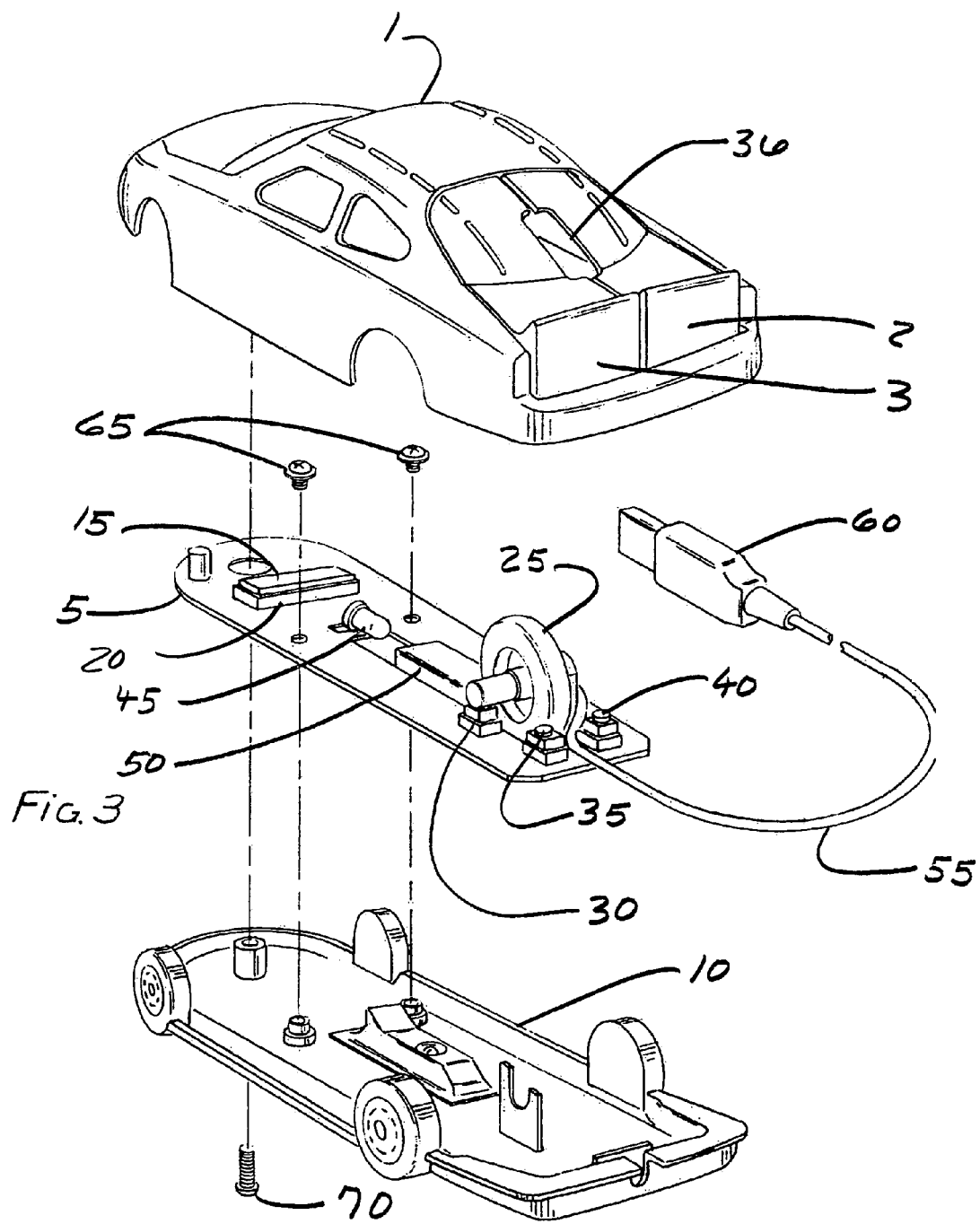
FIG. 3 is an exploded view showing the promotional housing, the electronics platform, and the lower portion of one embodiment of the present invention.

While one embodiment of the present invention is illustrated in the above referenced drawings and in the following description, it is understood that the embodiment shown is merely one example of a single preferred embodiment offered for the purpose of illustration only and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF ONE EMBODIMENT OF THE INVENTION

An exemplary embodiment of the present computer input device includes a computer mouse having an on-board computer chip that is preprogrammed with at least one unique Internet web page address, domain name, or URL address. When an actuatable button on the computer input device is actuated, the computer chip on-board the computer input device communicates instructions to the computer system to which the computer input device is communicatively connected. These instructions cause the computer system to log onto the Internet and access the unique Internet web page address, domain name, or URL address that was preprogrammed into the computer chip of the computer input device. In addition to this special Internet accessing feature, the computer input device is also equipped with the functions of a standard two or three button computer mouse that may or may not include a scroll wheel. This allows the user of the computer input device to use the computer input device as a standard computer mouse as well as a computer mouse that allows quick access to a unique Internet web page.

In one of the preferred embodiments of the present invention, the overall design of the computer mouse represents a product or service that a vendor wishes to promote. For example, a vendor that sponsors a race car that competes in NASCAR motorsports competition may wish to have the overall design of the mouse represent the style and shape of the specific automobile that the vendor sponsors. In addition to the overall shape being in the form of the race car being sponsored, other elements of the race car, such as the race car graphics displayed on the hood, doors, and trunk lid of the race car, can also be included.

In addition to the special promotional design of the housing of the computer input device, the internal electronics within the computer input device are designed to allow the user of the computer mouse to access the unique Internet web site for the vendor. This is accomplished by programming the computer chip that is installed on-board the computer input device to send a special signal to the computer system to which the computer input device is communicatively attached. The special signal instructs the computer system to log onto the Internet and to access the web page the vendor wishes the user of the promotional mouse to access. It is understood that in the preferred embodiment of the promotional mouse, the promotional mouse is preprogrammed to access the vendor's Internet web page regardless of the computer system to which the computer input device is attached.

Additionally, various embodiments of the computer input device are adapted to connect to a computer system through either the standard PS/2 mouse connection point, to a USB port on the computer system, or by using wireless communication methods. It is also understood that other embodiments of the present invention allow the computer input device to operate within either an PC-based or MacIntosh-based computer operating system. As a result of the variety of embodiments for the present invention, the computer input device can be easily used in conjunction with all currently standard computer operating systems. In a preferred embodiment, the computer input device is programmed to utilize whatever software driver/operating program that would exist on the user's computer system at the time that the mouse is operatively connected to the computer system, and therefore requires no additional software driver. Once manufactured, the promotionally styled computer mouse is given to individuals who are either potential customers or customers of the vendor.

Referring now to FIG. 1, one preferred embodiment of the present invention is shown. In this embodiment, the computer input device A comprises a promotional housing 1, an electronics mounting platform 5, and a base 10.

In this embodiment, the promotional housing 1 is in the form of a race car typically used in NASCAR motorsports racing. It is understood that the shape of the promotional housing 1 is adaptable to meet the advertising needs of almost any vendor. For example, a professional sports team may wish to promote a specific sport such as football. In that case, the promotional housing 1 of the computer input device A may be manufactured in the shape of a football. In likewise manner, another sports team may wish to design the computer input device A to take the form of its team mascot such as a tiger or a cardinal. In yet other situations, the promotional housing 1 of the computer input device A can be in the form of a vegetable to promote a specific chain of restaurants. Therefore, it is understood that the promotional mouse A can be designed in the shape of virtually any promotional design as long as the overall design of the computer input device A depicts the promotional form the vendor wishes to use to market and advertise the vendor's specific products and services, and as long as the overall shape of the promotional housing 1 is ergonomically designed to allow a computer user to comfortably use the computer input device A.

It is also understood that regardless of the shape or style of the promotional housing 1, the promotional housing includes at least one of a first button 2 and a second button 3. The first button 2 and the second button 3 are positioned on the promotional housing to be ergonomically located in a position similar to the orientation of similar buttons on a standard computer mouse.

The electronic mounting platform 5 of the present embodiment allows for the mounting of the various electronic components needed for the computer input device A to operate. In this embodiment, a computer chip 15 is installed onto a chip mount 20 that has been placed onto the electronic mounting platform 5. A scroll wheel 25 is mounted onto the electronic platform 5 to generate a first signal to be communicated to the computer system to which the computer input device A has been connected. The first signal in the present embodiment represents encoded signals that correspond to the rotation of the scroll wheel 25. When fully assembled, a portion of the scroll wheel 25 extends through an opening 36 in the promotional housing 1 thereby making the scroll wheel accessible to the user of the promotional mouse A.

It is understood that while the present embodiment uses an electronic mounting platform 5 to mount the electronic and electrical components of the computer input device A, other embodiments of the invention allow the electrical or electronic components to be mounted in other manners. For example, these components may be mounted directly to the base 10. In fact, any mounting means may be used as long as the resulting configuration of the computer input device A allows the device to be used as standard computer mouse, but with the ability to instruct a computer system to access the Internet web page, domain name, and/or URL address stored within the computer chip of the computer input device.

A first actuatable switch 30 is deposed beneath the scroll wheel 25 such that when the scroll wheel is depressed toward the first actuatable switch 30, a second signal is communicated to the computer system to inform the computer system that the actuatable switch 30 has been activated. A second actuatable switch 35 and a third actuatable switch 40 are also mounted to the electronic mounting platform 5. It is appreciated that each of the second actuatable switch 35 and the third actuatable switch 40 are positioned on the electronic mounting platform 5 to be in general alignment with the first button 2 and the second button 3 such that pressing either the first button or the second button will actuate one of either the second actuatable switch 35 of the third actuatable switch 40.

While many computer mouse devices use a rotatable ball in conjunction with encoders to communicate signals related to the two-dimensional location of the computer mouse on a mouse pad, the present embodiment incorporates optical components to generate the same general type of positional signals. The optical components of the present embodiment include a magnetic wave emitter 45 and a magnetic wave detector 50. It is understood that all types of positional encoders may be used in any embodiment of the present invention and still remain within the intended scope of the invention.

Each of the components mounted onto the electronic mounting platform 5 are interconnected with electrical conductors to allow the components to communicate with each other as needed, and to allow the computer input device A to communicate with the computer systems to which the computer input device is connected. To aid in the connection of the computer input device A with the computer system, the present embodiment of the invention includes a communication cable 55 attached to the appropriate electronic components mounted onto the electronic mounting platform 5. The other end of the communication cable 55 includes a connector 60 to communicatively attach the computer input device A to the computer system. In this embodiment, the connector 60 is a standard USB connector, however it is understood that any type of connector may used to match the communication port of the computer system to which the computer input device A will be used. It is also understood that in other embodiments of the present invention, the computer input device A may incorporate wireless communications methods that allow the computer input device to communicate with the computer system without the need for any communication cable 55 or connector 60. Such wireless communications are well known in the art and are incorporated within the scope of the present invention. In yet another embodiment of the present invention, the computer input device A is designed to operate as a "plug and play" device that allows the computer input device to automatically connect with and be installed onto the computer system when the computer input device A initially communicates with the computer system.

The electronic mounting platform 5 in the present embodiment is attached to the base 10 with two fasteners 65. The promotional housing 1 is then attached to the base 10 with at least one fastener 70. While the present embodiment describes the use of threaded components as the type of fastener 65 and 70 used herein, other types of attachment methods may be used to assemble the promotional housing, the electronic mounting platform 5, and the base 10 together. For example, rivets and glue may be used, or, frictional tabs that allow these three components to be snapped together. In yet other embodiments of the present invention, the housing of the computer input device may be constructed of one or more pieces as desired.

Operation of the Present Embodiment of the Invention

In operation, the computer input device A functions in all general respects as a standard computer mouse. That is, moving the computer input device A will act in a two-dimensional manner to move a cursor displayed on a computer monitor. Additionally, depression of either button 1 or button 2 will communicate the same signals to the computer system as do the two buttons on a standard computer mouse. Finally, the scroll wheel 25 operates in generally the same manner as a similar scroll on a standard computer mouse to provide a unique set of signals to the computer system that usually scroll a displayed image up or down on a computer monitor. The general operation of the standard computer mouse is well known to those skilled in the art and in a number of previously issued patents. More specifically, U.S. Pat. Nos. 3,835,464; 6,097,371; 5,912,661; and 6,014,130 offer extensive information regarding the functional operation, design characteristics, and component definition of a standard computer mouse, and each of those United States Patents are incorporated by reference into this patent as if set forth completely herein.

In addition to these commonly available functions, the scroll wheel 25 of the present embodiment offers a special mode of communication to the computer system. When the scroll wheel 25 is depressed by the user for more than a predetermined amount of time, the programming contained in the computer chip 15 will communicate with the computer system to instruct the computer system to log onto the Internet and to access a specific domain name and/or URL address that has been programmed into the computer chip 15 of the computer input device A.

Business Methods that may be Utilized by the Embodiments of the Present Invention as Described Herein The embodiments of the computer input device A as described herein offer a number of processes by which the vendor may advertise and market the vendor's goods to the recipient of the computer mouse. Some exemplary embodiments of these processes that may be used with the computer input device A are described below.

As a threshold matter, it is understood that the computer input device A is unique to the requirements of the vendor who will distribute the computer input device A to advertise and market the vendor's products and services. For example, the NASCAR shape of the presently described embodiment may be used by a vendor whose advertising graphics are displayed as a sponsor on the full-sized NASCAR that is actually raced in motorsports competition. Thus, when the vendor provides the computer input device A to a potential customer, the vendor is promoting the fact that the vendor is a NASCAR sponsor, and that the vendor is offering its products and services to the person to whom the computer input device A has been provided. Additionally, the unique design of the promotional housing 1 used with the computer input device A constantly reminds to the recipient of the computer input device that the vendor who provided the computer input device is interested in providing goods and services to recipient. Thus, in one embodiment of the process of using the computer input device, the overall shape of the computer input device A is selected to represent something about the vendor that reminds the user of the computer input device A that the mouse was provided by the vendor.

It is also understood that the domain name and/or URL address programmed into the computer chip 15 of the computer input device A is unique and reserved to the vendor that distributes the computer input device to the vendor's customers. A such, when the vendor informs the recipient of the computer input device A that depressing the scroll wheel 25 for a certain amount of time will cause the computer system to connect and log onto the vendor's Internet web page, the recipient of the computer input device A is provided with quick and simple access to the vendor's products and service lines, thus enhancing the prospect that the recipient will purchase a greater amount of goods or services from the vendor who provided the mouse. In another embodiment of the process for using the computer input device A, the vendor must establish a unique domain name and/or URL that is programmed into the computer chip 15 of the computer input device.

In another embodiment of the business process used in conjunction with the computer input device A, the computer chip 15 may be programmed to instruct the computer system to log onto the Internet and open a specific web page. This is accomplished by programming the unique domain name or URL address into the instructions of the computer chip 15. In this embodiment of the process, the computer input device A always accesses the same domain name and/or web page, and the contents of the web page are directly controlled by the vendor that distributed the computer input device.

In other embodiments of this business process, the vendor has the ability to indirectly change the web page that is accessed by the computer input device A without the need for reprogramming the computer chip 15. For example, in one embodiment of the process, the domain name of URL address programmed into the computer chip 15 is not the specific domain name or URL address of the vendor who has provided the computer input device A to a user. Instead, the domain name or URL address programmed into the computer chip 15 is that of an intermediate advertising services vendor. The intermediate advertising service vendor would control and maintain a unique domain name or URL address that has been reserved by the intermediate advertising service vendor for use only by the vendor that distributes the computer input device A. If the vendor who distributes the computer input device A desires the recipients of the computer input device to access a different Internet web page, the intermediate advertising service vendor will reprogram the contents of the web page programmed into the computer chip 15. The reprogrammed web page that is controlled and maintained by the intermediate advertising service vendor would then redirect the computer system being used by the recipient of the computer input device A to an alternative Internet web page that provides the new advertising or marketing information the vendor wishes to be made known to the recipient of the computer mouse. In this way, this embodiment of the business process used in conjunction with the computer input device A would eliminate the need to reprogram a new domain name and/or URL address into the computer chip 15 of the computer input device A, but would still provide the vendor that distributes the mouse with the ability to keep the information fresh on the web page accessed by the user of the computer input device. It is understood that while in one embodiment of the promotional computer mouse A, the Internet web page, domain name, or URL address is preprogrammed into the computer mouse before the computer mouse is distributed, in other embodiments, that information may be programmed into the mouse at any other appropriate time.

In light of this, it is appreciated that when this embodiment of the business process is used, the same computer input device A can be used to access an unlimited number of access web pages thus allowing the vendor who distributes the computer input device A to provide virtually any type of new or updated advertising and marketing information about the vendors products or services. And, it is understood that the user of the computer input device A is directed to the vendor's new or updated web pages without having to reprogram the computer chip 15 of the mouse. Therefore, this embodiment of the business process allows the vendor to widely distribute a single computer input device A to any number of recipients, and still allow the recipient to have access to fresh marketing and advertising information, but without reprogramming the computer input device A. In this embodiment, the computer input device A and the process that can be incorporated into the use of the computer input device described herein, provides the vendor that distributes the computer input device A with a useful tool for marketing and advertising the vendor's products.

While the above description describes various embodiments of the present invention, it will be clear that the present invention may be otherwise easily adapted to fit any configuration where a computer input device is required. As various changes could be made in the above constructions without departing from the scope of the invention, it is intended that all matter contained in the above description or shown in the accompanying drawings shall be interpreted as illustrative and not in a limiting sense. For example, while certain types of fasteners are described herein for the embodiment shown, various other type of fasteners may be used and remain within the scope of the present invention as long as the fasteners selected perform the same or similar function as the fastener that is being replaced.

What is claimed is:

1. A computer input device comprising:
    a computer mouse operatively connected to a user's computer system wherein at least one actuation of at least one control switch of the computer input device will result in a display of at least one of either a vendor's Internet web page, domain name, or URL address on the user's computer system,
    wherein the computer mouse has a promotional housing in a physical shape selected by a the vendor to promote at least one of either a product or a service offered by the vendor
    wherein the physical shape generally suggests the product or the service offered by the vendor,
    wherein the at least one of either the vendor's Internet web page, domain name, or URL displayed by the user's computer system matches an Internet web page, domain name, or URL address preprogrammed and stored within the computer input device, and
    wherein the computer input device contains all necessary software drivers and computer software to allow the computer input device to operate as a plug-and-play computer input device when communicatively connected with a computer system without the need to separately install specific configuration software onto the user's computer system prior to operatively connecting the computer input device to the user's computer system.

2. A computer input device comprising a computer mouse having a promotional housing in a physical shape selected by a vendor to promote at least one of either a product or a service offered by the vendor wherein the physical shape generally suggests at least one of either the product or the service offered by the vendor, and at least one actuatable button capable of initiating signals for communication to a computer system, wherein the at least one actuatable button is capable of initiating communication of at least one signal to the computer system that instructs the computer system to log onto a at least one of either the vendor's Internet web page, domain name, or URL address, and wherein the computer input device contains all necessary software drivers and computer software to allow the computer input device to operate as a plug-and-play computer input device when communicatively connected with a computer system without the need to separately install specific configuration software onto the user's computer system prior to operatively connecting the computer input device to the user's computer system.

3. The computer input device of claim 2 wherein the at least one vendor Internet web page, domain name, or URL address contains at least one of either, advertising information, marketing information, or general product or service information about the product or the service offered by the vendor.

4. The computer input device of claim 3 wherein the at least one actuatable control button is a scroll wheel.

5. The computer input device of claim 4 wherein the at least one signal to the computer system that instructs the computer system to log onto at least one of either the vendor's Internet web page, domain name, or URL address is initiated when the scroll wheel is depressed for at least a preset amount of time.

6. The computer input device of claim 5 wherein the computer input device uses wireless communication methods to communicate with the computer system.

7. The computer input device of claim 5 wherein the computer input devices uses optical devices to determine the location signals communicated to the computer system to control the two-dimensional placement of a cursor on a display monitor of the computer system.

8. The computer input device of claim 5 further comprising a communication cable to communicate signals between the computer input device and the computer system.

9. The computer input device of claim 8 wherein the communication cable includes a USB connector to communicatively attach the computer input device to the computer system.

10. The computer input device of claim 9 wherein the computer chip is deposed upon an electronic mounting platform.

11. The computer input device of claim 10 wherein the electronic mounting platform is attached to a base with two fasteners and the promotional housing is attached to the base with at least one fastener.

12. A process of providing a computer input device that allows access to a unique Internet web page, domain name, or URL address comprising the steps of:
 manufacturing a computer mouse such that at least one actuation of at least one control switch of the computer mouse will result in a computer system's display of at least one of either a vendor's Internet web page, domain name, or URL address that displays at least one of either advertising information, marketing information, or general information about a product or a service offered by the vendor;
 manufacturing the computer mouse to be in a physical shape that promotes, one of either directly or indirectly, the product or the service offered by the vendor, wherein the physical shape generally suggests the product or the service offered by the vendor;
 wherein the computer input device contains all necessary software drivers and computer software to allow the computer input device to operate as a plug-and-play computer input device when communicatively connected with a computer system without the need to separately install specific configuration software onto the user's computer system prior to operatively connecting the computer input device to the user's computer system; and
 distributing the computer mouse to at least one of either a customer of the vendor or a potential customer of the vendor.

13. The process of claim 12 further comprising the step of storing at least of either the vendor's Internet web page, domain name, or URL address in a computer chip of the computer mouse.

14. The process of claim 13 further comprising the step of manufacturing the computer mouse to contain all necessary software drivers and programs to allow the computer mouse to operate as a plug and play computer input device when communicatively connected with a computer system.

15. The process of claim 14 further comprising the step of storing the Internet web page, domain name, or URL address of vendor wherein the vendor controls and maintains the contents of the Internet web page, domain name, or URL address.

16. The process of claim 14 wherein the Internet web page, domain name, or URL address is reserved to the vendor by an intermediate advertising service vendor that controls and maintains the unique Internet web page, domain name, and/or URL address.

17. The process of claim 16 wherein the intermediate advertising service vendor controls and programs the contents of the Internet web page, domain name, or URL address reserved to the vendor such that the Internet web page, domain name, or URL address is capable of redirecting the computer system to a different Internet web page, domain name, or URL address that provides different advertising information, marketing information, or general information about the vendor's products or services.

18. A computer input device comprising:
 a computer mouse having a promotional housing in a physical shape selected by a vendor to promote at least one of either a product or a service offered by the vendor wherein the physical shape generally suggests the product or the service;
 means for allowing a user of the computer mouse to access a specific Internet web page, domain name, or URL address by operating a single actuatable switch on the computer mouse, and
 wherein the computer input device contains all necessary software drivers and computer software to allow the computer input device to operate as a plug-and-play computer input device when communicatively connected with a computer system without the need to separately install specific configuration software onto the user's computer system prior to operatively connecting the computer input device to the user's computer system.

19. The computer input device of claim 18 wherein the vendor's specific Internet web page, domain name, or URL address is preprogrammed into the computer mouse.

20. The computer input device of claim 19 wherein the specific Internet web page, domain name, or URL address is controlled by a vendor that has distributed the computer mouse to at least one of either a client of the vendor or a potential client of the vendor.

21. The computer input device of claim 20 wherein specific Internet web page, domain name, or URL address is controlled by an intermediate advertising service.

22. The computer input device of claim 21 wherein the intermediate advertising service is capable of adjusting the specific Internet web page, domain name, or URL address accessed by the user of the computer mouse such that the user can be redirected to another specific Internet web page, domain name, or URL address.

* * * * *